US008796895B2

(12) United States Patent
Choi et al.

(10) Patent No.: US 8,796,895 B2
(45) Date of Patent: Aug. 5, 2014

(54) ELECTRIC MOTOR AND ELECTRIC VEHICLE HAVING THE SAME

(75) Inventors: Jinha Choi, Seoul (KR); Gilwon Hong, Seoul (KR); Junyoung Lim, Seoul (KR); Jiseong Park, Seoul (KR); Hyeokjin Song, Seoul (KR); Jinsoo Park, Seoul (KR); Seungdo Han, Seoul (KR); Junggi Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 13/233,416

(22) Filed: Sep. 15, 2011

(65) Prior Publication Data

US 2012/0299409 A1 Nov. 29, 2012

(30) Foreign Application Priority Data

May 26, 2011 (KR) .................. 10-2011-0050310

(51) Int. Cl.
*H02K 16/02* (2006.01)
*H02K 21/12* (2006.01)
*H02K 1/27* (2006.01)
*H02K 1/02* (2006.01)

(52) U.S. Cl.
CPC .............. *H02K 21/12* (2013.01); *Y02T 10/641* (2013.01); *H02K 1/27* (2013.01); *H02K 1/02* (2013.01)
USPC .... 310/156.43; 310/64; 310/266; 310/156.49

(58) Field of Classification Search
USPC .................. 310/266, 156.43, 158.48–156.49
See application file for complete search history.

(56) References Cited

U.S. PATENT DOCUMENTS

| 5,744,895 A * | 4/1998 | Seguchi et al. .............. 310/266 |
| 6,177,745 B1 * | 1/2001 | Narita et al. ............. 310/156.43 |
| 6,590,312 B1 * | 7/2003 | Seguchi et al. .............. 310/266 |
| 6,903,471 B2 * | 6/2005 | Arimitsu et al. ................. 310/59 |
| 7,250,702 B2 * | 7/2007 | Abou Akar et al. ........... 310/114 |
| 2006/0061226 A1 | 3/2006 | Kim et al. |

FOREIGN PATENT DOCUMENTS

| EP | 0 905 858 A1 | 3/1999 |
| EP | 0 917 272 A1 | 5/1999 |
| EP | 1 102 385 A2 | 5/2001 |
| EP | 1 879 283 A1 | 1/2008 |
| EP | 1 892 814 A1 | 2/2008 |
| EP | 1 942 571 A1 | 7/2008 |
| JP | 2002-084722 A | 3/2002 |
| JP | 2004-304958 A | 10/2004 |
| JP | 2008-148550 A | 6/2008 |
| KR | 10-0680201 | 2/2007 |
| WO | WO 03/084028 A1 | 10/2003 |

* cited by examiner

*Primary Examiner* — Burton Mullins
(74) *Attorney, Agent, or Firm* — McKenna Long & Aldridge LLP

(57) ABSTRACT

An electric motor disposed in an electric vehicle includes a stator, a first rotor located at an outer side of the stator, and a second rotor located at an inner side of the stator, wherein each of the first rotor and the second rotor includes a plurality of first permanent magnets and a plurality of second permanent magnets, made of different materials from each other, whereby a material cost can be reduced and an output can be enhanced.

14 Claims, 7 Drawing Sheets

ELECTRIC MOTOR AND ELECTRIC VEHICLE HAVING THE SAME

CROSS-REFERENCE TO RELATED APPLICATION

This application claims the benefit of Korean Patent Application No. 10-2011-0050310, filed on May 26, 2011, which is hereby incorporated by reference for all purposes as if fully set forth herein.

BACKGROUND OF THE INVENTION

1. Field of the Invention

This specification relates to an electric motor and an electric vehicle having the same, and particularly, to an electric motor capable of reducing material costs and improving an output.

2. Background of the Invention

Recently, demands or uses of electric vehicles or hybrid vehicles (hereinafter, referred to as 'electric vehicle'), which use an electric motor as a power source or auxiliary power source, are increasing due to environmental pollution caused by exhaust gases from vehicles or automobiles, fossil fuel depletion and the like.

The electric motor may include a casing, a stator disposed within the casing, and a rotor disposed to be rotatable with respect to the stator.

The stator may generate heat due to copper loss (wire loss) and/or core loss during operation.

The rotor may use permanent magnets for enhancing power density.

Here, the electric motor used in the electric vehicle should provide high power density, and accordingly, be required to have a relatively high cooling performance.

The related art electric motor for the electric vehicle generates high heat during running. Accordingly, upon using the permanent magnets, the permanent magnets should exhibit less change in magnetic properties even at high temperature.

However, a permanent magnet, which exhibits such less change in the magnetic property even at the high temperature, is relatively expensive, which causes an increase in a material (permanent magnet) cost.

Furthermore, the related art electric motor for the electric vehicle is configured such that a cooling unit for cooling the electric motor cools the casing as well, which causes limitation on lowering temperature of the stator, which actually generates heat. Accordingly, there may be a limit to enhancing the output of the electric motor.

SUMMARY OF THE INVENTION

Therefore, to obviate the problems of the related art, an aspect of the detailed description is to provide an electric motor capable of enhancing an output, and an electric vehicle having the same.

Another aspect of the detailed description is to provide an electric motor capable of enhancing an output and reducing a fabricating cost, and an electric vehicle having the same.

Another aspect of the detailed description is to provide an electric motor capable of enhancing an output by way of lowering temperature of a stator, and an electric vehicle having the same.

To achieve these and other advantages and in accordance with the purpose of this specification, as embodied and broadly described herein, an electric vehicle may include a body, a plurality of wheels provided at the body, an electromotor to drive at least one wheel the electromotor including a stator including a cooling fluid passage to allow cooling fluid to pass therethrough, a first rotor located at an outer side of the stator, and a second rotor located at an inner side of the stator, which each of the first rotor and the second rotor includes a plurality of first permanent magnets and a plurality of second magnets made of different materials from each other, a battery provided in the body, an inverter coupled between the battery and the electromotor, the inverter including a plurality of elements to convert direct current (DC) power to alternating current (AC) power, and a cooling fluid circulation circuit coupled to the cooling fluid passage, the cooling fluid circulation circuit including a radiator to transfer heat from the cooling fluid to the radiator.

Here, the plurality of the first permanent magnets may be neodymium magnets, and the plurality of the second permanent magnets may be ferrite magnets.

A neodymium magnet and a ferrite magnet may be alternately disposed along a circumferential direction of the first rotor and the second rotor.

The plurality of first permanent magnets and the plurality of second permanent magnets may be disposed on an outer surface of the second rotor.

The plurality of first permanent magnets and the plurality of second permanent magnets may be disposed in the second rotor.

The plurality of second permanent magnets of the second rotor may align with the plurality of first permanent magnets of the first rotor, and the first plurality of permanent magnets of the second rotor may align with the plurality of second permanent magnets of the first rotor.

The cooling fluid passage may include a plurality of linear pipe parts inserted in the stator in an axial direction, and a plurality of connection pipe parts to couple the plurality of linear pipe parts to communicate with one another.

The stator core may include a plurality of first teeth at an inner surface of the stator core and a plurality of outer teeth at an outer surface of the stator core, and the plurality of linear pipe parts may be disposed between the plurality of first teeth and the plurality of second teeth.

In another aspect of this specification, an motor for an electric vehicle may include a stator including a cooling fluid passage to allow cooling fluid to pass therethrough, a first rotor located at an outer side of the stator, a second rotor located at an inner side of the stator, wherein each of the first rotor and the second rotor includes a plurality of first permanent magnets and a plurality of second magnets made of different materials from each other.

The plurality of the first permanent magnets may be neodymium magnets, and the plurality of the second permanent magnets may be ferrite magnets.

A neodymium magnet and a ferrite magnet may be alternately disposed along a circumferential direction of the first rotor and the second rotor.

The first rotor may further include a first rotor frame disposed at the outer side of the stator, and the first rotor frame may support the plurality of first permanent magnets and the plurality of second permanent magnets.

The plurality of first permanent magnets and the plurality of second permanent magnets may be disposed on an inner surface of the first rotor frame.

The second rotor may further include a second rotor core disposed at the inner side of the stator, and the second rotor core may support the plurality of first permanent magnets and the plurality of second permanent magnets.

The plurality of first permanent magnets and the plurality of second permanent magnets may be disposed on an outer surface of the second rotor core.

The plurality of first permanent magnets and the plurality of second permanent magnets may be disposed in the second rotor core.

The motor may further include an outer case, and a rotation shaft supported by the outer case, and the first rotor and the second rotor may be coupled to the rotation shaft.

The plurality of second permanent magnets of the second rotor may align with the plurality of first permanent magnets of the first rotor, and the first plurality of permanent magnets of the second rotor may align with the plurality of second permanent magnets of the first rotor.

The cooling fluid passage may include a plurality of linear pipe parts inserted in the stator in an axial direction, and a plurality of connection pipe parts to couple the linear pipe parts to communicate with one another.

The stator core may include a plurality of first teeth at an inner surface of the stator core and a plurality of outer teeth at an outer surface of the stator core, and the plurality of linear pipe parts may be disposed between the plurality of first teeth and the plurality of second teeth.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
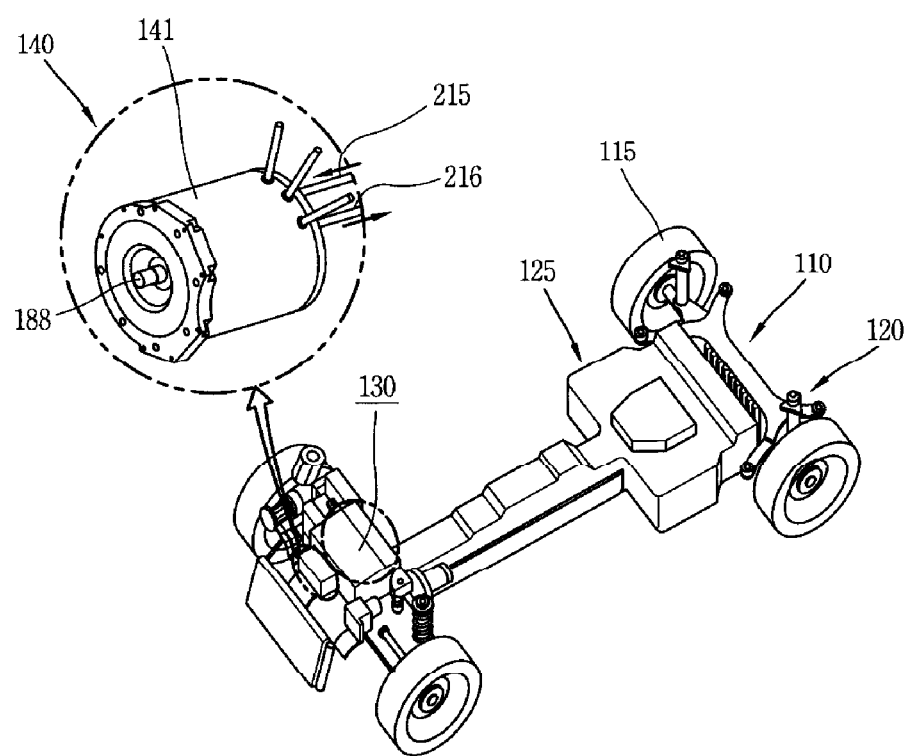
FIG. 1 is a schematic view showing a configuration of an electric vehicle having an electric motor in accordance with one exemplary embodiment.

As shown in FIG. 1, an electric vehicle having an electric motor in accordance with one exemplary embodiment may include a vehicle body 110, a battery 125 disposed in the vehicle body 110, and an electric motor 140 disposed in the vehicle body 110 and connected to the battery 125 to provide a driving force to the vehicle body 110.

Although not shown, a seating space for a passenger (driver, user, etc.) may be prepared at an upper area of the vehicle body 110.

The vehicle body 110 may include a plurality of wheels 115 to allow traveling.

The plurality of wheels 115 may be located at front, rear and both sides of the vehicle body 110, respectively.

A suspension system 120 for buffering vibration and impact, which are generated during traveling, may be disposed between the vehicle body 110 and each wheel 115.

The battery 125 disposed in the vehicle body 110 may supply electricity to the vehicle body 110.

The battery 125 may be implemented as a rechargeable secondary cell.

The electric motor 140 disposed in the vehicle body 110 may provide a driving force to the wheels 115.

An inverter 130 may be provided at the vehicle body 110. The inverter 130 may provide a driving force to the electric motor 140 to rotate the same. The inverter 130 may be connected to the battery 125 and the electric motor 140, respectively. In more detail, the inverter 130 may be connected to the batter 125 to receive direct current (DC) power from the battery 125. The inverter 130 may then convert the DC power into a driving force to provide to the electric motor 140.

Figure 2:
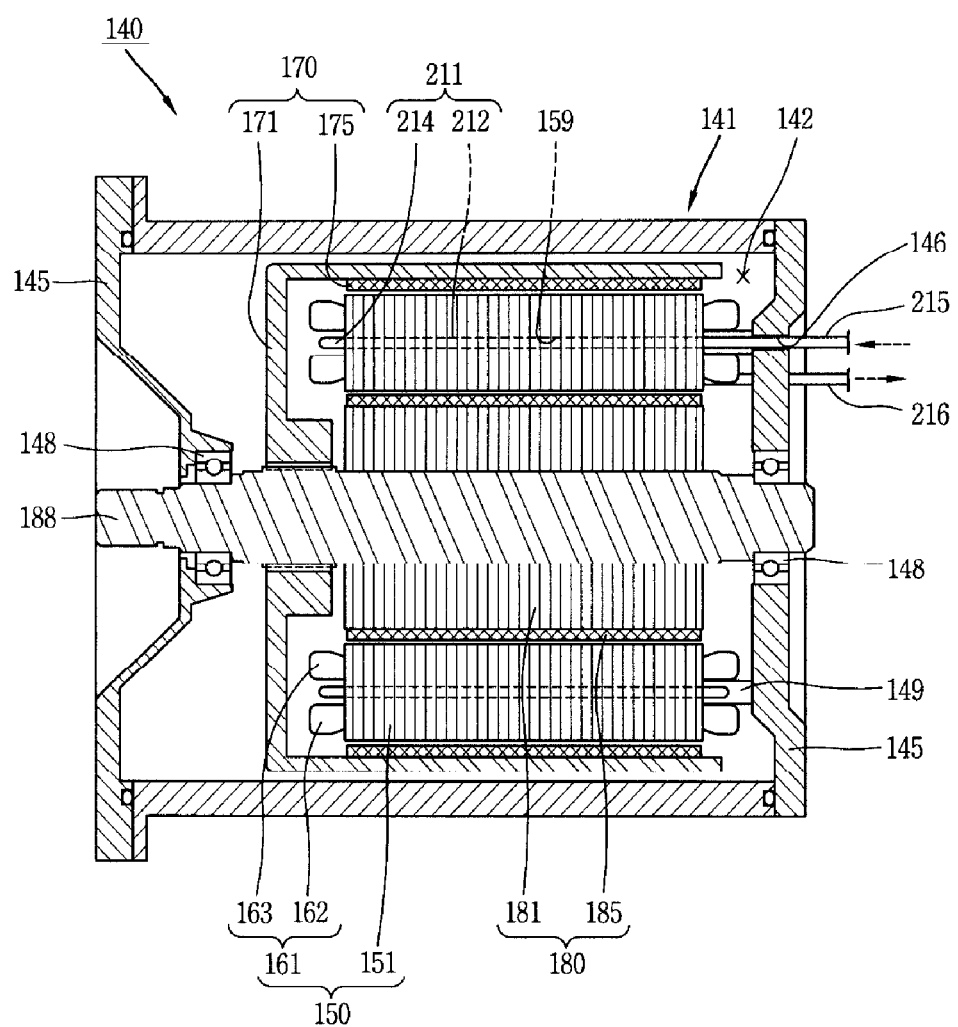
FIG. 2 is a sectional view of the electric motor shown in FIG. 1.

The electric motor 140, as shown in FIG. 2, may include a stator 150, a first rotor 170 located at an outer side of the stator 150, and a second rotor 180 located at an inner side of the stator 150. Each of the first and second rotors 170 and 180 may include a plurality of permanent magnets.

An outer case 141 may be provided outside the first rotor 170.

The outer case 141 may have an accommodation space 142 therein.

For example, the outer case 141 may have both ends open.

The outer case 141 may be in, but not limited to, a cylindrical form. The outer case 141 may alternately be implemented in various forms, such as a polygonal form.

Brackets 145 may be disposed at both ends of the outer case 141.

Each bracket 145 may have a bearing 148.

The stator 150 may include a stator core 151 having a plurality of slots at the outside and inside thereof, respectively, and a stator coil 161 wound on the stator core 151.

The stator 150 may be supported by the bracket 145 (e.g., the right bracket 145 in the drawing). For example, the bracket 145 may include a plurality of stator supports 149 coupled to the stator core 151. Each stator support 149 may protrude from an inner surface of the bracket 145.

Figure 3:
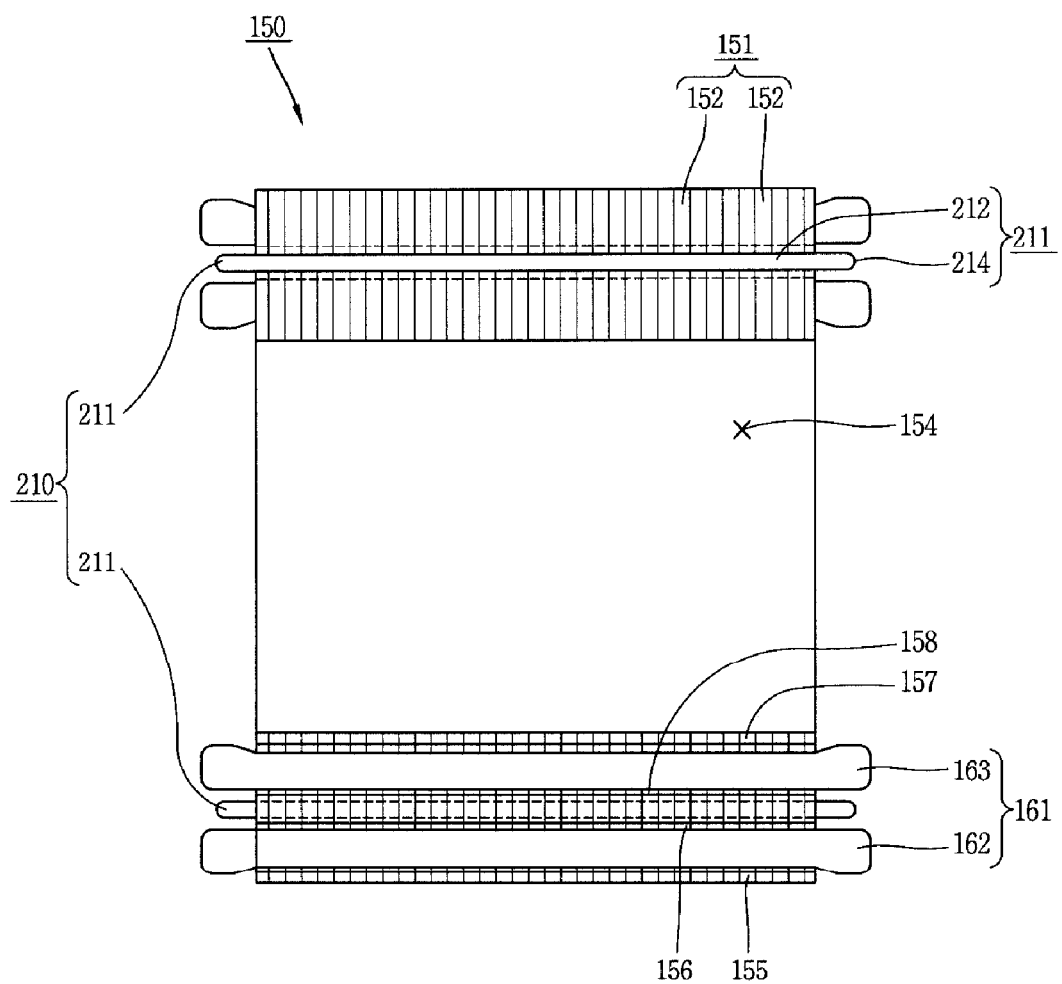
FIG. 3 is an enlarged view of a stator shown in FIG. 2.
Figure 4:
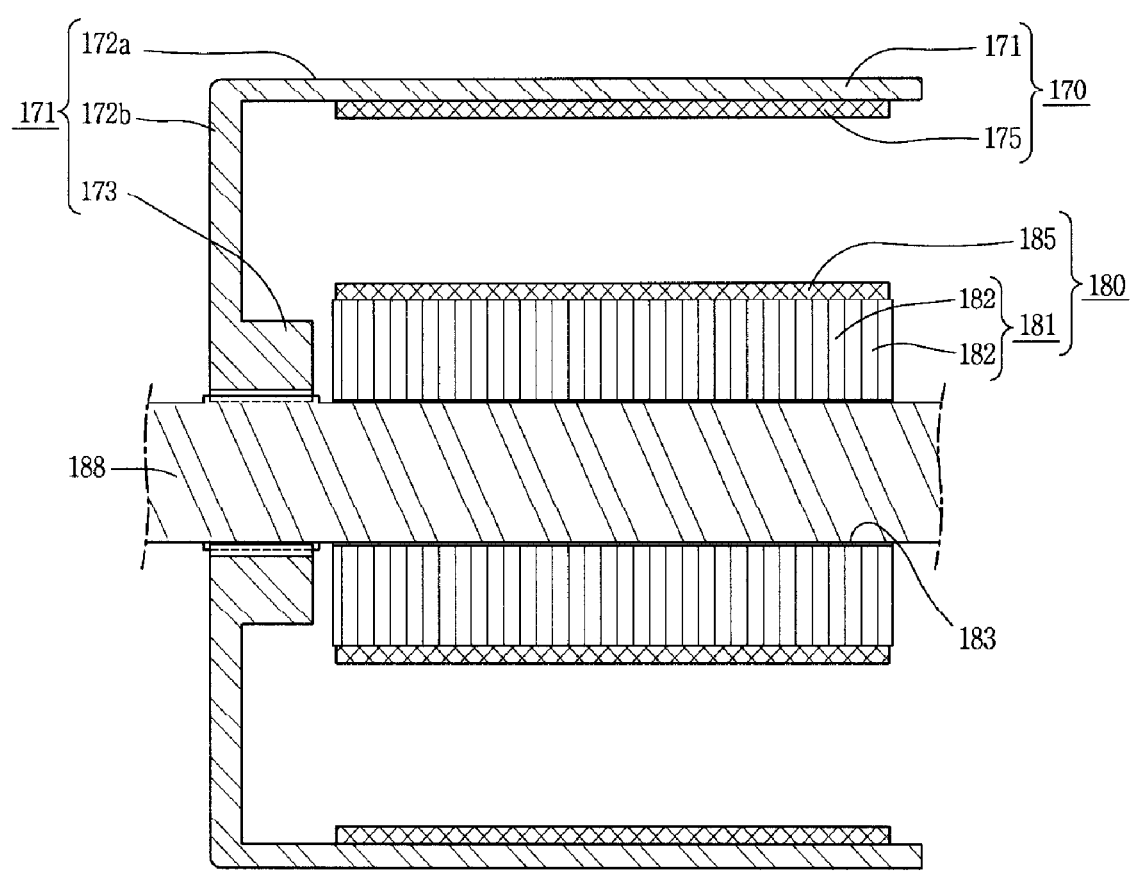
FIG. 4 is an enlarged view of a rotor shown in FIG. 2.
Figure 5:
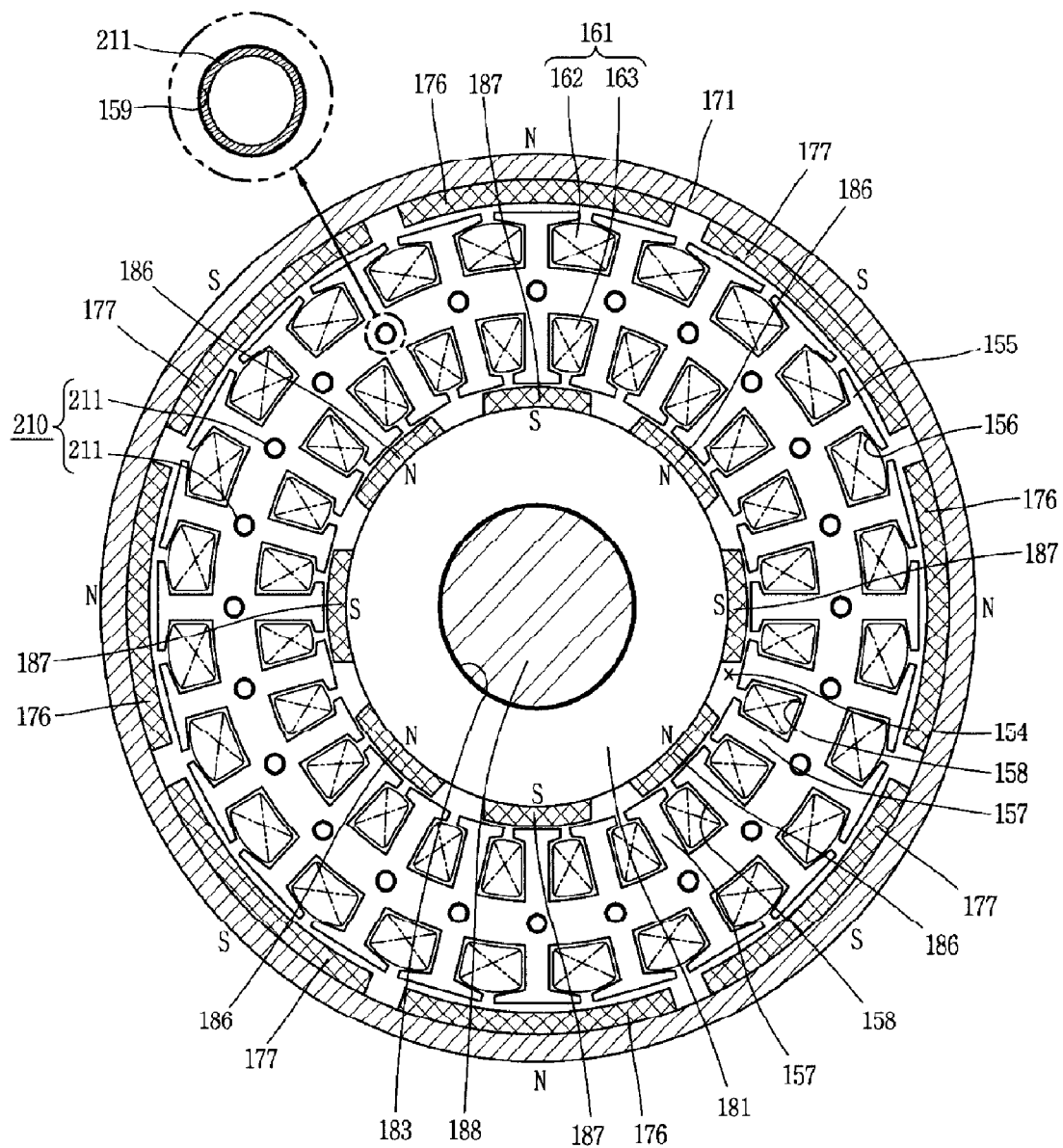
FIG. 5 is a sectional view of the electric motor taken along the line—of FIG. 2.

As shown in FIGS. 3 and 5, the stator core 151 may have an accommodation space 154 therein, in which the second rotor 180 is accommodated.

The stator core 151 may include a plurality of first teeth 155 protruding toward the first rotor 170, and a plurality of second teeth 157 protruding toward the second rotor 180

First slots 156 each may be located between the adjacent first teeth 155.

Second slots 158 each may be located between the adjacent second teeth 157.

The stator core 151, for example, may be configured by insulatingly laminating a plurality of electric steel plates 152, each having the accommodation space 154, the first teeth 155, the first slots 156, the second teeth 157 and the second slots 158.

The stator coil 161 may include a first stator coil 162 wound on each first slot 156, and a second stator coil 163 wound on each second slot 158.

In the meantime, the first rotor 170 and the second rotor 180 may be rotatably disposed at the outside and inside of the stator 150, respectively. Here, the first rotor 170 and the second rotor 180 may be coupled to the same rotation shaft 188. The rotation shaft 188 may be rotatably supported by the bearings 148 disposed at the brackets 145, respectively.

The first rotor 170, for example, may include a first rotor frame 171, and a plurality of permanent magnets 175 located at the first rotor frame 171.

The first rotor frame 171 may be configured in a cylindrical shape having one open side. Here, an inner diameter of the first rotor frame 171 may be greater that an outer diameter of the stator 150 such that the rotor 150 can be accommodated therein.

The rotor frame 171 may have a shaft coupling portion 173, in which the rotation shaft 188 is inserted. The shaft coupling portion 173 may be coupled with the rotation shaft 188 to be restricted by each other in a rotating direction.

The first rotor frame 171 may include a cylindrical section 172a having an inner diameter greater than the outer diameter of the stator 150, and a disc section 172b formed to block one end portion of the cylindrical section 172a. The shaft coupling portion 173 may be formed in the central area of the disc section 172b. Here, the first rotor frame 171 may be made of a magnetic substance (for example, a steel plate, etc.).

The plurality of permanent magnets 175 may be disposed on the inner surface of the first rotor frame 171.

Especially, the permanent magnets 175 may be disposed on the inner surface of the cylindrical section 172a.

The permanent magnets 175 of the first rotor 170 may have a radius of curvature corresponding to an inner diameter of the cylindrical section 172a.

The permanent magnets 175 of the first rotor 170 may include first permanent magnets 176 and second permanent magnets 177, which are formed of different materials from each other.

For example, the first permanent magnet 176 may be made of neodymium (Nd), whereas the second permanent magnet 177 may be made of ferrite. Accordingly, the small number of Nd magnets, which are relatively expensive, are employed, thereby reducing a material cost for the permanent magnets. As commonly known, the Nd magnet retains high magnetic properties even at relatively high temperature but may be high-priced. In addition, the ferrite magnet exhibits excellent magnetic properties at relatively low temperature but its magnetic properties may be lowered at high temperature. However, the ferrite magnet is much cheaper than the Nd magnet. Hence, the electric motor 140 may adapt the ferrite magnet, which is relatively low-cost, which may result in reduction of a material cost for the permanent magnets by virtue of decrease of the number of high-priced Nd magnets.

The first permanent magnets 176 and the second permanent magnets 177 may be alternately disposed along a circumferential direction of the first rotor frame 171.

The first permanent magnet 176 and the second permanent magnet 177 may be magnetized to have different magnetic poles (i.e., N-pole and S-pole). The first and second permanent magnets 176 and 177 may be magnetized in a radial direction of the first rotor 170. For example, outer and inner surfaces of each of the first and second permanent magnets 176 and 177 may have different poles (e.g., N-pole and S-pole).

The second rotor 180 may include a second rotor core 181, and a plurality of permanent magnets 185 disposed at the second rotor core 181. Here, the second rotor core 181 may be smaller than the inner diameter of the stator core 151 so as to be located at the inner side of the stator core 151.

A shaft hole 183, in which the rotation shaft 188 may be inserted, may be formed through the center of the second rotor core 181. For example, the second rotor core 181 may be configured by insulatingly laminating a plurality of electric steel plates 182 each having the shaft hole 183 at the center thereof.

The permanent magnets 185 may include first permanent magnets 186 and second permanent magnets 187, which are made of different materials from each other.

The first permanent magnet 186 may be made of neodymium (Nd), whereas the second permanent magnet 187 may be made of ferrite.

The first and second permanent magnets 186 and 187 may be located on the outer surface of the second rotor core 181.

Each of the first and second permanent magnets 186 and 187 may have a radius of curvature corresponding to the outer diameter of the second rotor core 181.

The first and second permanent magnets 186 and 187 may be alternately disposed along a circumferential direction of the second rotor core 181.

The first and second permanent magnets 186 and 187 may be magnetized to have different magnetic poles (i.e., N-pole and S-pole). Here, the first and second permanent magnets 186 and 187 may be magnetized in a radial direction of the second rotor 180.

Here, the permanent magnets 175 of the first rotor 170 and the permanent magnets 185 of the second rotor 180 may be disposed such that the permanent magnets made of different materials face each other.

In more detail, the second permanent magnet 187 of the second rotor 180 may be disposed at the inner side of the first permanent magnet 176 of the first rotor 170 in a radial direction of the first rotor frame 171. Also, the first permanent magnet 186 of the second rotor 180 may be disposed at the inner side of the second permanent magnet 177 of the first rotor 170. Such arrangement may reduce deviation of flux distribution between the first rotor 170 and the second rotor 180. Consequently, a torque ripple caused by the deviation of the flux distribution can be minimized or prevented, and noise generation due to the torque ripple can be avoided.

Figure 6:
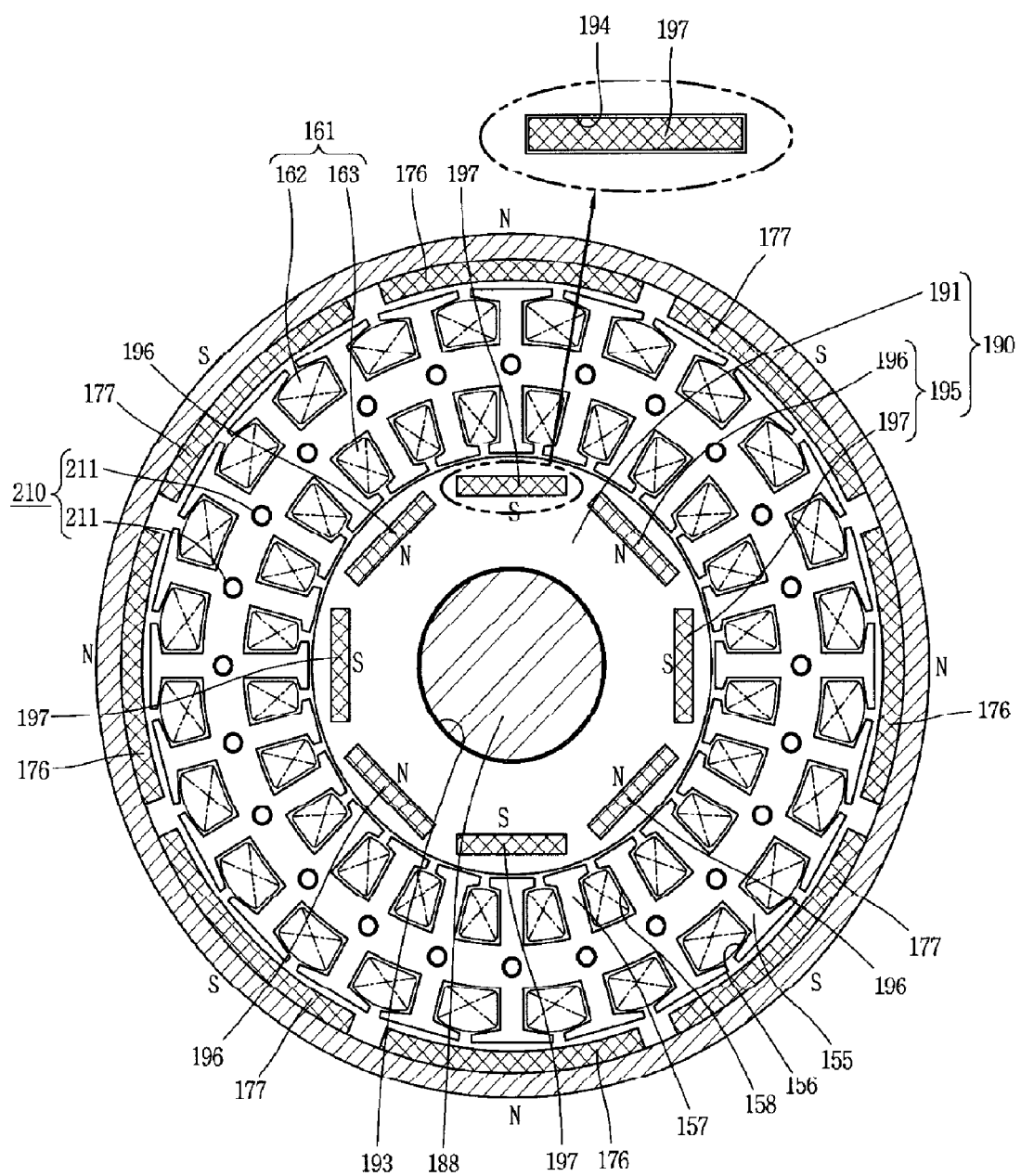
FIG. 6 is a view of an electric motor, corresponding to FIG. 5, in accordance with another exemplary embodiment.

Meanwhile, as another exemplary embodiment shown in FIG. 6, a second rotor 190, may include a second rotor core 191, and a plurality of permanent magnets 195 inserted in the second rotor core 191 in an axial direction.

Here, the plurality of permanent magnets 195 of the second rotor 190, as aforementioned, may include first permanent magnets 196 and second permanent magnets 197 made of different materials. For example, the first permanent magnet 196 may be an Nd magnet and the second permanent magnet 197 may be a ferrite magnet. Also, the first and second permanent magnets 1196 and 197 of the second rotor 190 may be alternately disposed along a circumferential direction of the second rotor core 191. The first and second permanent magnets 196 and 197 of the second rotor 190 may be magnetized to have different magnetic poles.

The permanent magnets 195 may be in form of rectangular parallelepiped with a predetermined thickness.

A shaft hole 193, in which the rotation shaft 188 may be inserted, may be formed at the center of the second rotor core 191. A plurality of permanent magnet inserting portions 194 may be formed through the second rotor core 191 such that the permanent magnets 195 can be inserted therein in the axial direction. The second rotor core 191 may be configured by insulatingly laminating a plurality of electric steel plates each having the shaft hole 193 at the center and the permanent magnet inserting portions 194 penetratingly formed around the shaft hole 193.

The permanent magnets 195 of the second rotor 190 may be arranged to face the permanent magnets 175 of the first rotor 170 made of a different material from the permanent magnets 195. In more detail, the second permanent magnet 197 of the second rotor 190 may be disposed at the inner side of the first permanent magnet 176 of the first rotor 170. Also, the first permanent magnet 196 of the second rotor 190 may be disposed at the inner side of the second permanent magnet 177 of the first rotor 170.

In the meantime, the electric motor 140 may include a cooling unit 210 for cooling the stator 150 using cooling fluid, which allows the stator 150 to be fast cooled. Here, liquid having a low freezing point, for example, brine or the like, may be used as the cooling fluid.

More concretely, for example, the cooling unit 210 may include a cooling pipe 211 having a passage for the cooling fluid and coupled to the stator core 151.

In the structure of the electric motor 140, the cooling pipe 211, in which cooling fluid flows, may be disposed to cool the stator coil 161 and the stator core 151 by virtue of the cooling fluid. Accordingly, heat generated from the stator coil 161 and the stator core 151 can be fast removed, thereby minimizing an increase in temperature of the stator coil 161 and the stator core 151. The stator coil 161 and the stator core 151 can thusly stay in the relatively low temperature state. Hence, increases in wire loss and core loss of the stator 150 due to temperature increase can be minimized, resulting in enhancing the power density of the electric motor 140.

The cooling pipe 211 may include a plurality of linear pipe parts 212 formed through the stator core 151 in an axial direction, and a plurality of connection pipe parts 214 for connection of the linear pipe part 212 to be communicated one another. Here, the linear pipe parts 212 may be disposed with being spaced apart from one another along a circumferential direction of the stator core 151. The connection pipe part 214 may communicate, but not limited to, end portions of the adjacent linear pipe parts 212 with each other.

The stator core 151 may include a plurality of cooling pipe connection portions 159 formed through the stator core 151 for insertion of the linear pipe parts 212 therein.

For example, the cooling pipe connection portions 159 may be formed between the first teeth 155 and the second teeth 157 of the stator core 151, respectively.

The cooling unit 210 may include a cooling fluid inlet part 215, through which the cooling fluid flows in, and a cooling fluid outlet part 216, through which the cooling fluid flows out. Here, the exemplary embodiment shows that the cooling unit 210 includes a single path, defined by the cooling fluid inlet part 215, the cooling pipe 211 and the cooling fluid outlet part 216. Alternatively, the cooling unit 210 may include a plurality of paths, defined by the cooling fluid inlet part 215, the cooling pipe 211 and the cooling fluid outlet part 216.

The cooling fluid inlet part 215 and the cooling fluid outlet part 216 may be exposed out of the outer case 141.

For example, the cooling fluid inlet part 215 and the cooling fluid outlet part 216 may penetrate the bracket 145 to be exposed externally. The bracket 145 (i.e., the right bracket in the drawing) may have through holes 146, in which the cooling fluid inlet part 215 and the cooling fluid outlet part 216 are inserted, respectively.

By the way, the electric vehicle may include a cooling fluid circulation unit 220 for allowing the cooling fluid to circulate via the electric motor 140.

The cooling fluid circulation unit 220 may include a fluid pipe 222 defining a passage for the cooling fluid, and a cooling fluid flow facilitating element for facilitating (promoting) the flow of the cooling fluid.

The fluid pipe 222 may be connected to the cooling fluid inlet part 215 and the cooling fluid outlet part 216 of the cooling unit 210, respectively. Accordingly, the cooling fluid can circulate via the cooling unit 210 so as to cool the stator 150.

The cooling fluid flow facilitating unit, for example, may be implemented as a pump 224.

Figure 7:
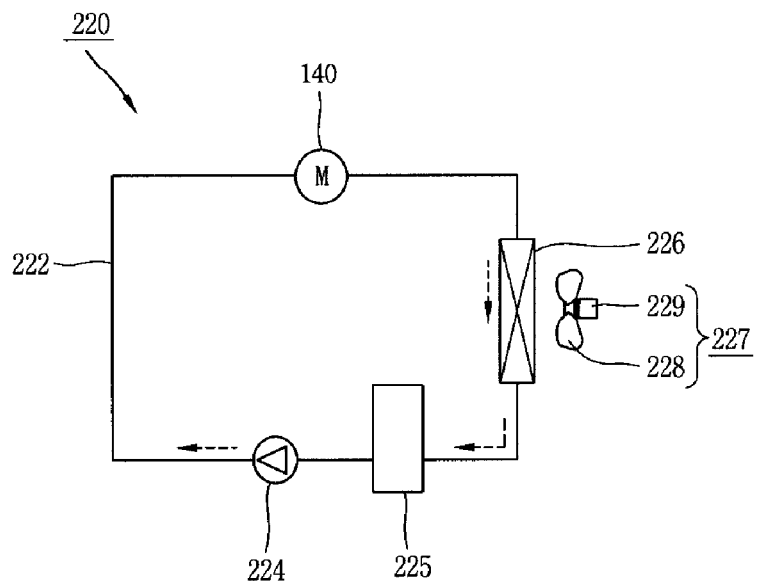
FIG. 7 is a view showing a configuration of a cooling fluid circulation unit of the electric vehicle of FIG. 1.

As shown in FIG. 7, a tank 225 for temporarily storing the cooling fluid may be provided at one side of the pump 224 (especially, an inlet side or an upstream side of the pump 224).

The cooling fluid circulation unit 220 may further include a radiator 226, by which the cooling fluid is cooled.

The radiator 226, although not shown in detail, may include a heat transfer pipe defining a passage for the cooling fluid, and a plurality of fins for facilitating radiation of the heat transfer pipe. One side of the radiator 226 may be shown, having a cooling fan 227 for facilitating heat-exchange of the radiator 226. The cooling fan 227 may include rotatable wings 228 and a motor 229 for rotating the rotatable wings 228.

The electric vehicle may further include a controller 240 having a control program.

The controller 240 may detect temperature of the cooling fluid to control a flow speed of the cooling fluid. For example, the controller 240 may increase the flow speed of the cooling fluid when the temperature of the cooling fluid exceeds a preset temperature, which allows reduction of temperature of the cooling fluid. The controller 240 may control the pump 224 to increase revolutions per minute (RPM) of the pump 224 in order to increase the flow speed of the cooling fluid.

Figure 8:
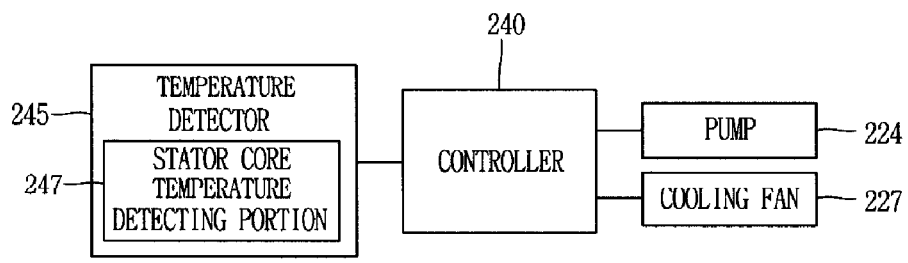
FIG. 8 is a control block diagram of the electric vehicle of FIG. 1.

The controller 240, as shown in FIG. 8, may be controllably connected with a temperature detector 245 for detecting temperature of the cooling fluid, and the pump 224, respectively.

The controller 240 may be configured to control the cooling fan 227 to facilitate radiation of the radiator 226. The cooling fan 227 may be connected to the controller 240 so as to be controllable by the controller 240.

The controller 240 may detect a temperature of the stator core 151 to control the flow speed of the cooling fluid.

The temperature detector 245 may include a stator core temperature detecting portion 247 for detecting temperature of the stator core 151.

With such configuration, when a driving signal is input in the electric motor 140, a driving force is applied to the stator coil 161. More Concretely, the first stator coil 162 and the second stator coil 163 form magnetic fields (rotating magnetic field), respectively. Accordingly, the first rotor 170 and the second rotor 180 may rotate based on the rotation shaft 188.

Upon power being applied to the stator coil 161, temperatures of the stator coil 161 and the stator core 151 may be increased by heat.

After power is applied to the stator coil 161, cooling fluid may circulate the cooling unit 210. Accordingly, the stator coil 161 and the stator core 151 may be maintained in a low temperature state without a drastic increase in temperature, and thus an increase in wire loss and core loss due to the temperature increase can be minimized, thereby enhancing power density.

In the meantime, the controller 240 may detect the temperature of the cooling fluid by virtue of the temperature detector 245 and control the flow speed of the cooling fluid based on the detected temperature of the cooling fluid.

The controller 240 may increase the RPM of the pump 224 when the detected temperature of the cooling fluid exceeds a preset temperature. When the RPM of the pump 224 increases, the flow speed of the cooling fluid may increase accordingly. When the flow speed of the cooling fluid increases, a heat radiation speed of the cooling fluid can be faster than the temperature increase speed of the cooling fluid, thereby lowering the temperature of the cooling fluid.

The controller 240 may control the flow speed of the cooling fluid by detecting temperature of the stator core 151. When the temperature of the stator core 151 detected by the stator core temperature detecting portion 247 exceeds a preset temperature, the controller 240 may increase the RPM of the pump 224 to increase the flow speed of the cooling fluid. Consequently, the temperature of the stator core 151 can be maintained to be lower than the preset temperature.

As described above, in accordance with one exemplary embodiment, an output of the electric motor can be enhanced by disposing a first rotor and a second rotor at the inner and outer sides of a stator, respectively, and providing permanent magnets made of different materials.

Also, the permanent magnets made of different materials may allow reduction of a material cost for the permanent magnets.

In addition, a cooling unit for cooling the stator may be employed, thus to directly cool the stator, which actually generates heat. Accordingly, the stator can be maintained at relatively low temperature, which results in reduction of wire loss and core loss, caused due to an increase in the temperature, and enhancement of an output.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electric vehicle comprising:
   a body;
   a plurality of wheels provided at the body;
   an electromotor to drive at least one wheel, the electromotor including,
   a stator including a cooling fluid passage to allow cooling fluid to pass therethrough,
   a first rotor located at an outer side of the stator, and
   a second rotor located at an inner side of the stator,
   wherein each of the first rotor and the second rotor comprises a plurality of first permanent magnets and a plurality of second magnets made of different materials from each other;
   a battery provided in the body;
   an inverter coupled between the battery and the electromotor, the inverter including a plurality of elements to convert direct current (DC) power to alternating current (AC) power; and
   a cooling fluid circulation circuit coupled to the cooling fluid passage, the cooling fluid circulation circuit including a radiator to transfer heat from the cooling fluid to the radiator,
   wherein the plurality of the first permanent magnets are neodymium magnets, and the plurality of the second permanent magnets are ferrite magnets,
   wherein a neodymium magnet and a ferrite magnet are alternately disposed along a circumferential direction of the first rotor and the second rotor, and
   wherein the plurality of second permanent magnets of the second rotor align with the plurality of first permanent magnets of the first rotor, and the plurality of first permanent magnets of the second rotor align with the plurality of second permanent magnets of the first rotor.

2. The electric vehicle of claim 1, wherein the plurality of first permanent magnets and the plurality of second permanent magnets are disposed on an outer surface of the second rotor.

3. The electric vehicle of claim 1, wherein the plurality of first permanent magnets and the plurality of second permanent magnets are disposed in the second rotor.

4. The electric vehicle of claim 1, wherein the cooling fluid passage comprises:
   a plurality of linear pipes inserted in the stator in an axial direction; and
   a plurality of connection pipes to couple the plurality of linear pipes to communicate with one another.

5. The electric vehicle of claim 4, wherein the stator core comprises a plurality of first teeth at an outer surface of the stator core and a plurality of second teeth at an inner surface of the stator core, wherein the plurality of linear pipes are disposed between the plurality of first teeth and the plurality of second teeth.

6. A motor for an electric vehicle comprising:
   a stator including a cooling fluid passage to allow cooling fluid to pass therethrough;
   a first rotor located at an outer side of the stator; and
   a second rotor located at an inner side of the stator;
   wherein each of the first rotor and the second rotor comprises a plurality of first permanent magnets and a plurality of second magnets made of different materials from each other,
   wherein the plurality of the first permanent magnets are neodymium magnets, and the plurality of the second permanent magnets are ferrite magnets,
   wherein a neodymium magnet and a ferrite magnet are alternately disposed along a circumferential direction of the first rotor and the second rotor, and
   wherein the plurality of second permanent magnets of the second rotor align with the plurality of first permanent magnets of the first rotor, and the plurality of first permanent magnets of the second rotor align with the plurality of second permanent magnets of the first rotor.

7. The motor of claim 6, wherein the first rotor further comprises a first rotor frame disposed at the outer side of the stator, and the first rotor frame supports the plurality of first permanent magnets and the plurality of second permanent magnets.

8. The motor of claim 7, wherein the plurality of first permanent magnets and the plurality of second permanent magnets are disposed on an inner surface of the first rotor frame.

9. The motor of claim 6, wherein the second rotor further comprises a second rotor core disposed at the inner side of the stator, and the second rotor core supports the plurality of first permanent magnets and the plurality of second permanent magnets.

10. The motor of claim 9, wherein the plurality of first permanent magnets and the plurality of second permanent magnets are disposed on an outer surface of the second rotor core.

11. The motor of claim 9, wherein the plurality of first permanent magnets and the plurality of second permanent magnets are disposed in the second rotor core.

12. The motor of claim 6, further comprising:
   an outer case; and
   a rotation shaft supported by the outer case and the first rotor and the second rotor are coupled to the rotation shaft.

13. The motor of claim 6, wherein the cooling fluid passage comprises:
   a plurality of linear pipes inserted in the stator in an axial direction; and
   a plurality of connection pipe parts to couple the linear pipe parts to communicate with one another.

14. The motor of claim 13, wherein the stator core comprises a plurality of first teeth at an outer surface of the stator core and a plurality of second teeth at an inner surface of the stator core, wherein the plurality of linear pipes are disposed between the plurality of first teeth and the plurality of second teeth.

\* \* \* \* \*